United States Patent [19]
Hoshimi et al.

[11] 4,446,490
[45] May 1, 1984

[54] PCM SIGNAL PROCESSING CIRCUIT

[75] Inventors: Susumu Hoshimi, Yokohama; Tadashi Kojima, Yokosuka, both of Japan

[73] Assignees: Sony Corporation; Tokyo Shibaura Denki Kabushiki Kaisha, both of Japan

[21] Appl. No.: 322,279

[22] Filed: Nov. 17, 1981

[30] Foreign Application Priority Data

Nov. 18, 1980 [JP] Japan .................... 55-162177

[51] Int. Cl.³ .................... G11B 5/00; G11B 27/02
[52] U.S. Cl. .................... 360/32; 360/13
[58] Field of Search .................... 360/13, 14.1, 32, 33

[56] References Cited

U.S. PATENT DOCUMENTS

| | | | |
|---|---|---|---|
| 4,138,694 | 2/1979 | Doi et al. | 360/32 |
| 4,224,642 | 9/1980 | Mawatari et al. | 360/32 |
| 4,274,115 | 6/1981 | Wada et al. | 360/32 |
| 4,363,049 | 12/1982 | Ohtsuki et al. | 360/32 |

Primary Examiner—Vincent P. Canney
Attorney, Agent, or Firm—Hill, Van Santen, Steadman & Simpson

[57] ABSTRACT

A PCM signal processor having a signal input terminal which receives a PCM data signal, a memory for storing the PCM data signal, a standardized signal input terminal for providing a standardized signal corresponding to a synchronizing signal for synchronizing the PCM data signal reproducing apparatus, an address counter for designating the address of the memory which is to be read and means for providing said address counter with preset data in response to the standardized signal.

14 Claims, 16 Drawing Figures

PCM SIGNAL PROCESSING CIRCUIT

BACKGROUND OF THE INVENTION

1. Field of the Invention

This invention relates to a PCM (Pulse Code Modulation) signal processor and particularly to a PCM signal processor in which when reproducing an audio PCM signal, the timing of the reproduced PCM data is stabilized with a specific synchronizing signal.

2. Description of the Prior Art

A known PCM recording and reproducing apparatus has been proposed in which analog and audio signals such as music are converted to an audio PCM signal, to which an error-correction code and an error-detection code are added. The signal is then converted to the same signal format as a television signal which is then recorded or reproduced with a VTR (Video Tape Recorder). Dropout can be caused by dust or the like on a magnetic tape which is used as the recording medium in the VTR; it is possible that a burst error may occur in the recorded PCM signal. If such burst error occurs, it becomes quite difficult to error-correct the lost data. To cope with this problem, in a PCM processor for converting the audio PCM signal to a quasi-video signal, the following arrangement has been proposed. After converting the audio PCM signal to a video signal, during recording, parity data for the PCM data and error-correction are separated for each plurality of words to form a block, and each word of such block is delayed by different times so as to disperse the data to provide interleaving. Upon converting the video signal to the audio PCM signal, during reproducing, a reverse operation (de-interleaving) is carried out and the burst error is dispersed, thereby to correct the data. For delayed processing of the interleaving and the de-interleaving, there is employed a RAM (Random Access Memory). For editing a plurality of different PCM data, the video signal reproduced from a reproducing VTR is recorded by a recording VTR, which may cause deterioration of the tone or data quality. In order to prevent such deterioration, once the video signal derived from the reproducing VTR is converted to the audio PCM signal and after error-corrected, the audio PCM signal is again converted to the video signal, and then recorded on the recording VTR.

In practice, in order to perform cross-fade treatment to smoothly connect two data elements to each other at a editing point or to decide the editing point with higher accuracy than the frame accuracy, the operating modes of the editing system are quite complicated. During editing to determine the editing point and to do the editing, it is necessary that timing to produce the data recorded at a certain specified position from the reproducing circuit of the PCM processor not be changed at each initiation of reproducing operations. However, in a known apparatus, each time the reproducing VTR is driven, the timing to write the reproduced data in the RAM of the processor will be different from each other, thus making editing quite difficult.

SUMMARY OF THE INVENTION

An object of this invention is to provide a new PCM signal processor which can solve the afore-described problems.

Yet another object of this invention is to provide a PCM signal processor which can facilitate editing.

A further object of this invention is to provide a PCM signal processor wherein when the reproducing apparatus is synchronized and driven, a memory can be controlled so as to produce data for de-interleaving with a synchronizing signal with constant timing.

Other objects, features and advantages of the invention will be readily apparent from the following description of certain preferred embodiments thereof taken in conjunction with the accompanying drawings although variations and modifications may be effected without departing from the spirit and scope of the novel concepts of the disclosure, and in which:

DESCRIPTION OF THE PREFERRED EMBODIMENTS

Figure 1:
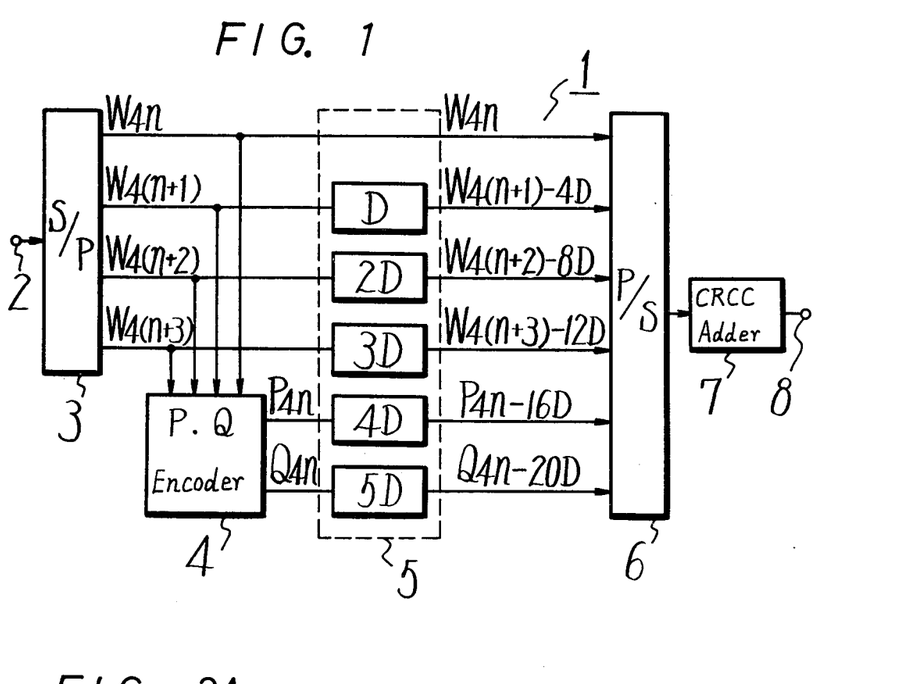
FIG. 1 is a block diagram of one example of an encoder provided in a processor to which this invention is applicable.
Figure 2A:
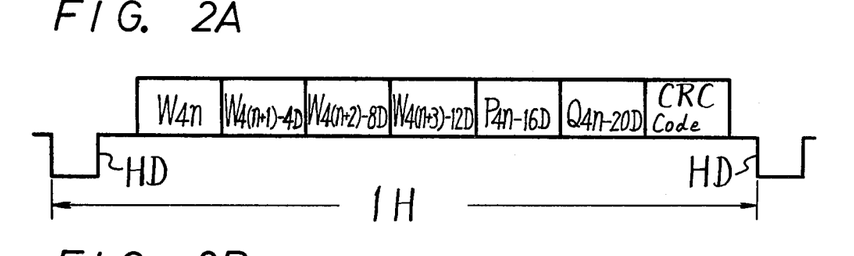
FIGS. 2A and 2B are schematic diagrams showing a data transmission format when the data generated by the arrangement of the block diagram as seen in FIG. 1 is converted to a quasi-video signal.
Figure 2B:
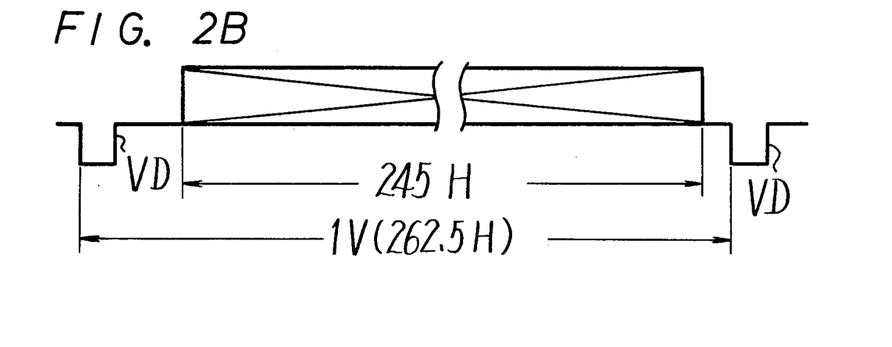

FIG. 1 illustrates an encoder of a PCM audio processor to which this invention is applicable and a signal format produced therefrom is shown in FIGS. 2A and 2B.

In FIG. 1, an error-correction encoder 1 of a recording circuit of a processor is serially, supplied with data of right and left channels of a two channel stereo system. The signals are alternately sampled at each sampling time from an input terminal 2. A total of four sampled data, for example, two samples for each channel are supplied and converted to a parallel word with a serial-parallel converter 3. If the four data words with a certain timing are represented by, for example, $W_{4n}$, $W_{4(n+1)}$, $W_{4(n+2)}$ and $W_{4(n+3)}$ where $(n=0, 1, 2 \ldots )$, such data words are applied to a P Q encoder 4 to produce error-correction codes $P_{4n}$ and $Q_{4n}$ according to the following equations:

$$P_{4n} = W_{4n} \oplus W_{4(n+1)} \oplus W_{4(n+2)} \oplus W_{4(n+3)}$$

$$Q_{4n} = T^4 W_{4n} \oplus T^3 W_{4(n+1)} \oplus T^2 W_{4(n+2)} \oplus T W_{4(n+3)}$$

The described data word $W_{4n}$, $W_{4(n+1)}$, $W_{4(n+2)}$ and $W_{4(n+3)}$ and the parity words $P_{4n}$ and $Q_{4n}$, each comprising units of six words, are supplied to an interleaver 5.

The interleaver 5 is provided to delay each data series by amounts of 0, D, 2D, 3D, 4D and 5D and to produce six words of $W_{4n}$, $W_{4(n+1)}-4D$, $W_{4(n+2)}-8D$, $W_{4(n+3)}-12D$, $P_{4n}-16D$ and $Q_{4n}-20D$ which are converted to serial data by a parallel-serial converter 6 where D is a unit delay time for interleaving, which might be for example, 16 blocks. A CRCC (Cyclic Redundancy Check Code) adder 7 adds a CRC code to the six words for error-detection and produces one block data and supplies it to an output terminal 8. The interleaver 5 is comprised of a RAM and performs time-base compression as well as the interleaving. Such one block data is inserted into one horizontal interval of a video signal and a horizontal synchronizing signal HD is also added thereto to form a signal illustrated in FIG. 2A. The plurality of blocks are inserted into an interval of 245 H, within one vertical interval (1V) of the video signal, excluding a predetermined interval during which a vertical synchronizing signal VD is added. With like operations a recording PCM signal of a quasi-video signal form is produced which is supplied to a video input terminal (not shown) of the VTR where it is recorded on a magnetic tape using a rotary head.

Figure 3:
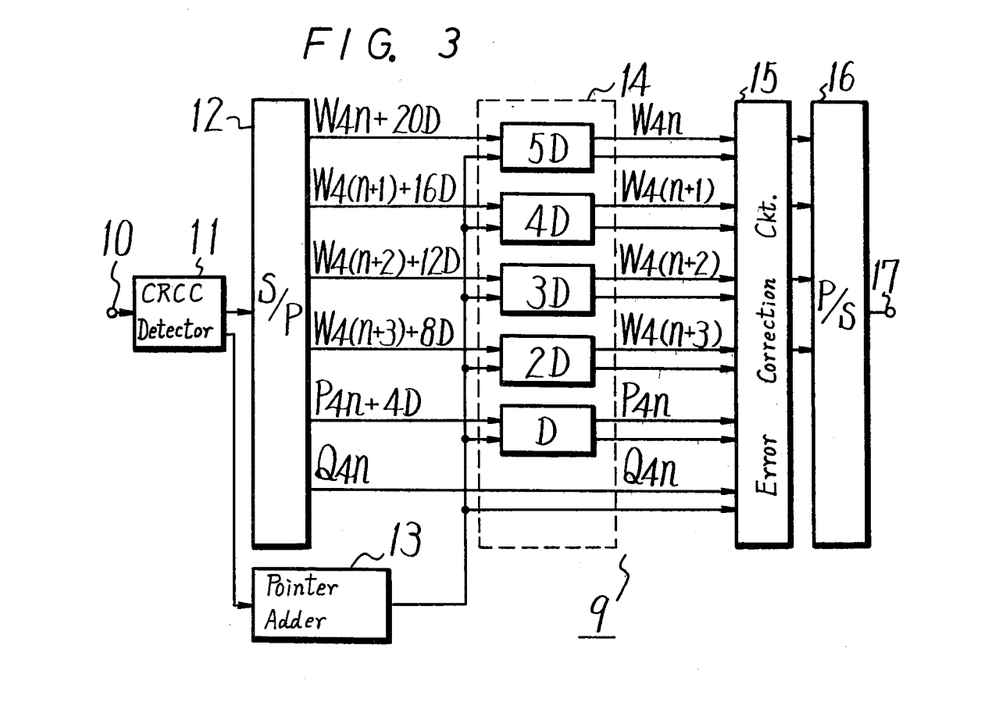
FIG. 3 is a block diagram of one example of a decoder in the processor for de-interleaving and error-correcting the data generated by the arrangement of the block diagram shown in FIG. 1.

The PCM signal thus recorded is produced at a video output terminal of a reproducing VTR and after the horizontal synchronizing signal HD, the vertical synchronizing signal VD are separated therefrom, is supplied to an input terminal 10 of an error-correction decoder 9 such as shown in FIG. 3. The PCM signal is applied to a serial-parallel converter 12 after the presence or absence of errors are checked by a CRCC detector 11. The converter 12 converts the signal to a parallel word, one block of which is comprised of $W_{4n}+20D$, $W_{4(n+1)}+16D$, $W_{4(n+2)}+12D$, $W_{4(n+3)}+8D$, $P_{4n}+4D$ and $Q_{4n}$. When the block is indicated in error by the CRCC detector 11, a pointer adder 13 adds a pointer to each word in each error block to indicate the presence of the error. These data are supplied to a de-interleaver 14 wherein processing which is the reverse of the interleaving of the interleaver 5 in the encoder 1 is performed. The de-interleaver 14 delays each data series by respective times of 5D, 4D, 3D, 2D, D and 0 and produces six words of $W_{4n}$, $W_{4(n+1)}$, $W_{4(n+2)}$, $W_{4(n+3)}$, $P_{4n}$ and $Q_{4n}$. An error-correction circuit 15 error-corrects these six words employing the parity words $P_{4n}$ and $Q_{4n}$ so as to produce four words $W_{4n}$, $W_{4(n+1)}$, $W_{4(n+2)}$ and $W_{4(n+1)}$ which are corrected for error when possible, and these are converted to serial data by a parallel-serial converter 16.

Figure 4:
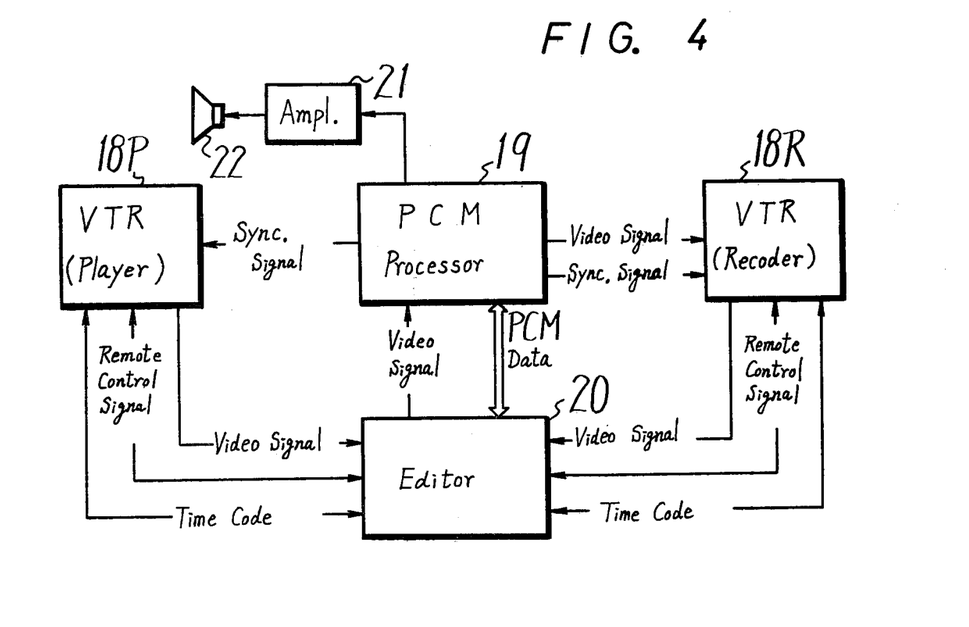
FIG. 4 is a block diagram showing electronic editing equipment.

For editing an audio PCM signal the apparatus of FIG. 4 is used. A reproducing mode VTR 18P and a recording mode VTR 18R which may be of the rotary two heads-type are coupled to a PCM processor 19 and a PCM editing apparatus 20. The video output of the reproducing VTR 18P is supplied to the PCM processor 19 through the editing apparatus 20 in which a recording signal output is applied to the video input terminal of the recording VTR 18R. The PCM processor 19 respectively supplies synchronizing signals to the reproducing and recording VTR's 18P and 18R. Also, to the PCM editing apparatus 20 is applied the video output from the recording VTR 18R and between the PCM processor 19 and the editing apparatus 20 the PCM data is exchanged which has not as yet been converted to the video signal form. Also, between the editing apparatus 20 and each VTR 18P and 18R there are exchanged a remote controlling signal and a time code signal. It is arranged that reproduced signals from the VTRs 18P and 18R can be monitored by reproducing the output of a D/A converter (not shown) within the PCM processor through an amplifier 21 to a speaker 22. The two VTRs 18P and 18R are synchronized with each other and operated by the synchronizing signals from the PCM processor 19. The operation modes are remote-controlled by key operations in the PCM editing apparatus 20. Also, an absolute address up to the frame unit can be recognized by time codes which are recorded on longitudinal tracks of the magnetic tapes in the VTRs 18P and 18R. In the PCM editing system after the VTRs 18P and 18R reproduce each tape and an editing point has been decided, the VTRs 18P and 18R are regulated in phase by employing the time codes so as to edit. In other words, the two VTRs 18P and 18R are simultaneously started to reproduce each tape from known positions to which they are pre-positioned and then momentarily stopped and are switched from the reproducing mode to the recording mode at the editing point. In order to perform cross-fade processing so as to interconnect the two data to each other at the editing point or to decide the editing point with higher accuracy than the frame accuracy, results in the operating modes of the editing system being more complicated. During editing for determining the editing point and to carry out the editing it is necessary that timing for producing data recorded at a certain specified position from the reproducing circuit of the PCM processor 19 not be changed at each initiation of the reproducing apparatus.

According to this invention to solve this problem, when the reproducing circuit of the processor 19 is synchronized with the recording circuit, a memory is provided for de-interleaving is controlled so as to produce data which always has a constant timing relative to the synchronizing signals.

Figure 5:
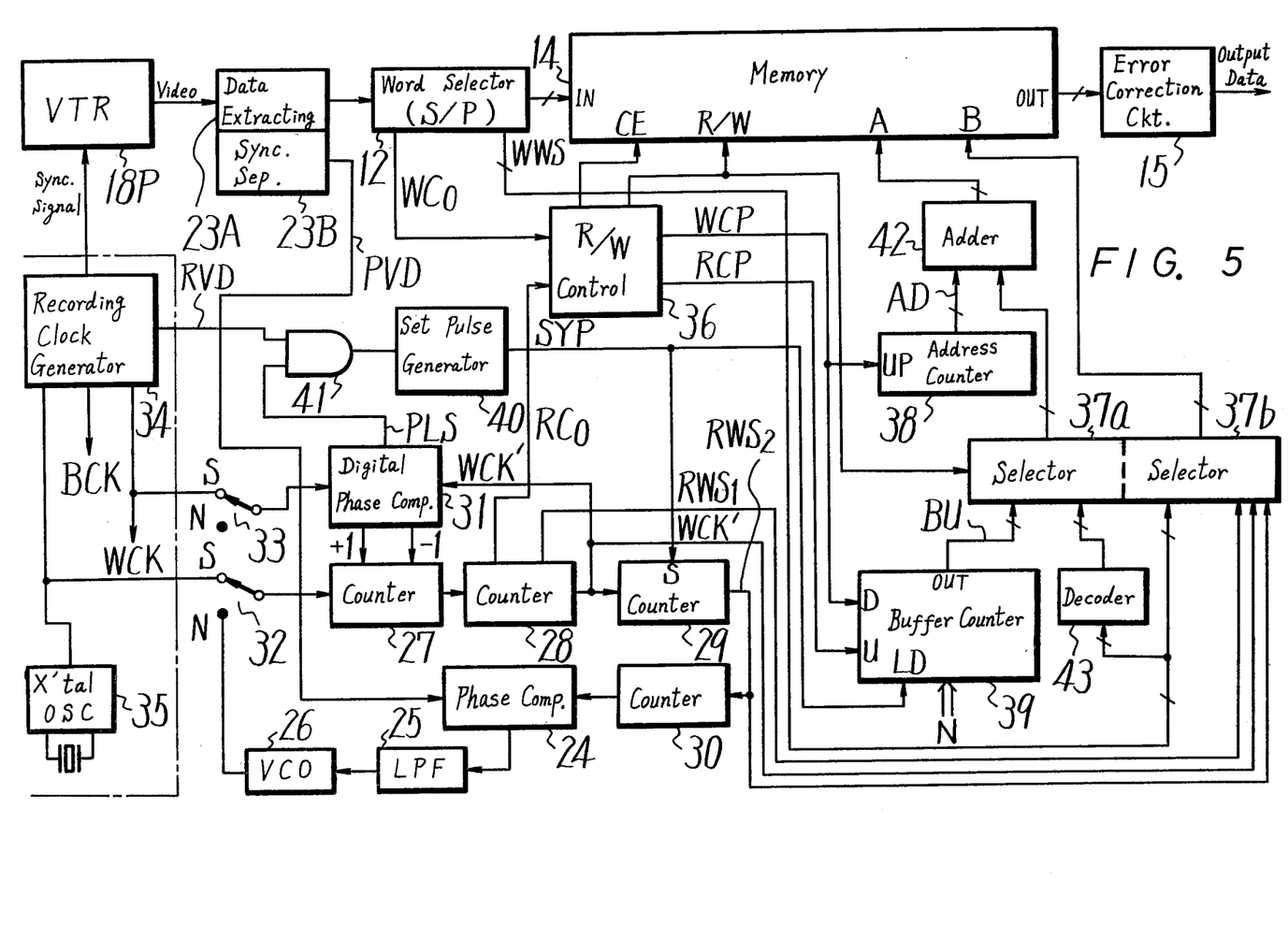
FIG. 5 is a block diagram of one embodiment of this invention.

One embodiment in which this invention is applied to the reproducing circuit of such PCM processor 19 is shown in FIG. 5. The video signal reproduced from the reproducing VTR 18P in the PCM editing system as shown in FIG. 4 is supplied to a data extracting circuit 23A provided within the processor 19 wherein the extracted data is applied to a word selector 12 which comprises the serial-parallel converter and the data with bit serial format is converted to six words parallel data (the arrangements such as the CRCC detector 11 and the pointer adder 13 are omitted). Such data is applied to a data input terminal of the memory 14 which comprises a RAM. At the output terminal of the memory 14 data appears to which time-base extension, de-interleaving and so forth have been accomplished in order to compress the time-base, perform interleaving and convert the data into the original format and from which any time-base variation caused by the tape transport system of the VTR has been eliminated. Such data is supplied to and error-corrected by the error-correction circuit 15. The error-corrected data is supplied to the parallel-serial converter 16 which produces the serial data outputs, one of which is applied to the D/A converter and the other is directly supplied to the serial data input terminal 2 of the encoder 1 of the recording equipment where it is encoded once again, and recorded in the recording VTR 18R. The same video signal input has a vertical synchronizing pulse signal PVD separated therefrom by a synchronizing signal separator 23B and is supplied to a phase comparator 24 in a reproducing clock signal generating means.

The reproducing clock signal generating means includes equipment to generate a clock signal such as necessary for data processing in the reproducing circuit. This is composed of a VCO 26 (Voltage Controlling Oscillator) to which a compared output of the phase comparator 24 is supplied through a low-pass filter 25. Counters 27, 28, 29 and 30 are used for frequency-dividing, and a digital phase comparator 31 and switches 32 and 33 are also included. During normal reproduction or sync (synchronizing) reproduction, the respective switches 32 and 33 are switched to either normal position N or to a sync position S. During normal reproduction a master clock signal which is produced by the VCO 26 is supplied to the counter 27, through the switch 32. The switch 33 is moved from S so that the word clock signal WCK on the recording portion is not provided to the digital phase comparator 31 which inhibits the phase comparison. During sync reproduction, the synchronizing signal formed by a recording clock signal generating means 34 on the encoder 1 side is applied to the synchronizing input of the VTR 18P and it is utilized as a reference signal. For example, a capstan phase servo system of the VTR 18P and the reproduced signal are synchronized with the synchronizing signal. During such sync reproduction, a master clock signal produced by a crystal oscillator 35 on the recording side is supplied to the counter 27 through the switch 32, and the word clock signal WCK on the recording side is applied to the digital phase comparator 31, and therein is phase-compared with a word clock signal WCK' from the reproducing side. The phase-compared output is used to control the frequency-dividing ratio of the counter 27 to three different ratios, $1/A-1$, $1/A$ and $1/A+1$, to thereby perform a phase lock so as to remove any phase difference between the recording and reproducing sides. The digital phase comparator 31 serves to synchronize the word clock signal in an initial stage when a switch for a voltage supply is turned ON or immediately after the normal reproduction mode is selected or during other occasions and at the same time, the phase comparator 31 produces a phase lock signal PLS which is "1" only in the phase lock state.

The counters 28 and 29 form a read timing pulse signal $RC_0$, read word select pulse signals $RWS_1$ and $RWS_2$ and a word clock signal WCK'. The counter 30 is provided to frequency-divide the word select pulse signal $RWS_2$ to a pulse signal at a field frequency. The recording clock signal generating means 34 produces a bit clock signal BCK and the reproducing clock signal generating means (not shown) forms a bit clock signal. The word selector 12 generates a write timing pulse signal $WC_0$ which is synchronized with the reproduced data and a write word select pulse WWS of 3 bits. The read timing pulse $RC_0$ and the write timing pulse $WC_0$ are supplied to a read/write controller 36 which forms a tip enable pulse signal and a read/write pulse signal from the memory 14. The read/write pulse signal controls address selectors 37a and 37b.

Each time writing and reading of one block of data are terminated, the read/write controller 36 produces clock pulse signals WCP and RCP. The clock pulse signal WCP is supplied to an address counter 38 as an additional input and also to a buffer counter 39 as a subtraction input. The clock pulse signal RCP is applied to the buffer counter 39 as an addition input. The buffer counter 39 is formed of a presettable counter and a set pulse signal SYP from a set pulse signal generator 40 is supplied to preset a specified number N. The set pulse generator 40 produces the set pulse signal SYP when the output of an AND gate 41 is "1". That is, when the word clock signals are phase-locked with each other between the recording and reproducing sides and the phase lock signal PLS is "1", a vertical synchronizing signal RVD from the recording clock signal generating means 34 is supplied to the set pulse signal generator 40 through the AND gate 41, thereby producing the predetermined set pulse signal SYP. The counter 29 employed for a ½ frequency-divider is set by the set pulse signal SYP.

The address selectors 37a and 37b are adapted to select a recording address or reproducing address for lower bits and upper bits of each address. The upper bits from the address selector 37a are supplied directly to the memory 14 and the lower bits from the address selector 37a are applied and added to an address code AD from the address counter 38 by an adder 42 and are then supplied to the memory 14.

Figure 6:
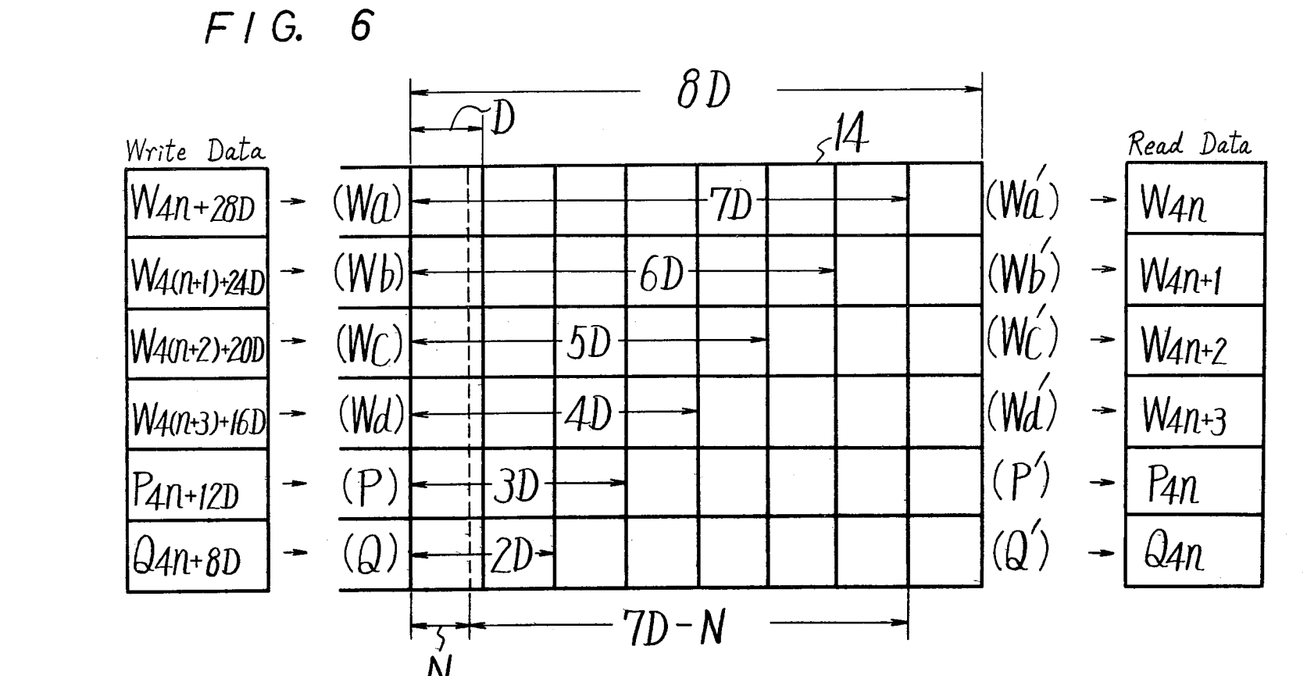
FIG. 6 is a diagram for explaining the address control having a memory in the invention.

A basic mode of the memory 14 will be described relative to FIG. 6. Data from the word selector 12 is to be written by each block in the memory 14. If each word positioned sequentially from the first word to the successive word in one block of data is represented by Wa, Wb, Wc, Wd, P and Q, the memory 14 is provided with six memory areas to be written with six words respectively and each memory area includes a capacity of 8D. The address counter 38 is adapted to count words, with one period being 8D at a maximum. The first word Wa of one block is written in an address X+7D wherein 7D is added to an address X determined by the output AD of the address counter 38 (the upper bit upon overflow may be neglected). The write word selecting pulse signal WWS specifies the first memory area in the six areas and a decoder 43 produces an address code corresponding to 7D. Each word Wb, Wc, Wd, P and Q of 2nd to 6th is respectively written in addresses of X+6D, X+5D, X+4D, X+3D and X+2D. When the writing of one block data is completed, the clock signal WCP is produced so that the address counter 38 take condition +1 and the buffer counter 39 takes condition −1. As described above, at the data interval of the reproduced data from the VTR 1A, the data is written in the specified position of the memory 14. FIG. 6 shows a write address when AD=0.

The memory 14 is adapted to repeat reading at a constant cycle independent of the input. The output BU of the buffer counter 39 derived from the address selector 37a and the output AD of the address counter 38 are supplied and added to each other by the adder 42 thereby discriminating the address as the read address and the read word selecting pulse signals $RWS_1$ and $RWS_2$ and the word clock signal WCK' are considered the upper bits. That is, the upper bits specify any one of six memory areas and with respect to the above memory area, one word is read out from the address which is decided by the output of the adder 42. After completion of reading out one block, the clock signal RCP changes the output BU of the buffer counter 39 to +1 and moves to read the next block. As described before, since the write addresses are sequentially spaced apart from Wa by D, if the words read out from each memory area are marked and discriminated by a prime, Wa' is recognized as the one having a maximum delay time from the input. Likewise, in a order of Wb', Wc', Wd', P' and Q', the delay times are made smaller or reduced by each D. As a result, the output data of the memory 14 are converted or de-interleaved and the data takes the form of that of the original data before being interleaved. The write operation is performed by the clock signal which is synchronized with the reproduced data only during the data interval and the read operation is successively performed by a reference clock signal. Accordingly, the time-base variation amount is removed therefrom and the memory 14 produces the data which is time-base extended so that the error-correction circuit 15 error-corrects utilizing the parity data P' and Q'. Since the buffer counter 39 increases the word in the read operation and decreases the word in the write operation, the value of the output BU thereof is increased/decreased in a certain range. The buffer counter 39 is adapted to indicate the buffer capacity during the read and write operations.

Further, in one embodiment of this invention, it is arranged that the timing of the memory 14 for producing the data is always held constant relative to the reference vertical synchronizing signal RVD.

The VTR 18P is synchronized and driven by the synchronizing signal of the recording side and in a state of PLS="1" where the word clock signals of the recording and reproducing sides are synchronized with each other, the vertical synchronizing signal RVD is supplied to a set pulse signal generator 40 through the AND gate 41, thereby producing the set pulse signal SYP. The set pulse signal SYP sets the counter 29 and a specified number N, for example, 15 is preset in the buffer counter 39.

Figure 7A:
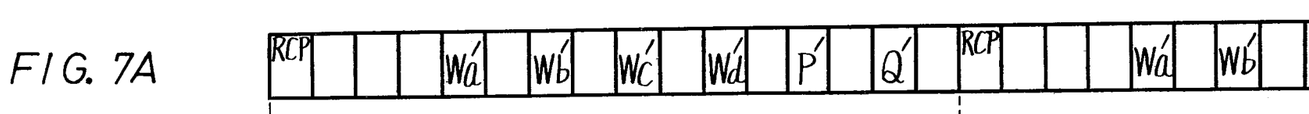
FIGS. 7A–7I are plots of wave forms versus time for explaining the operation of one embodiment of this invention.
Figure 7B:
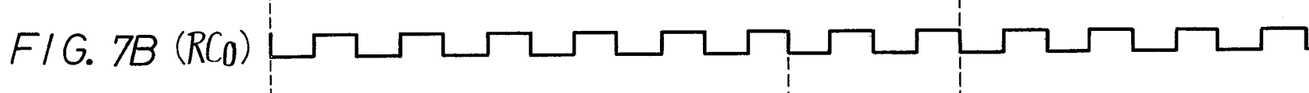
Figures 7C, 7D:
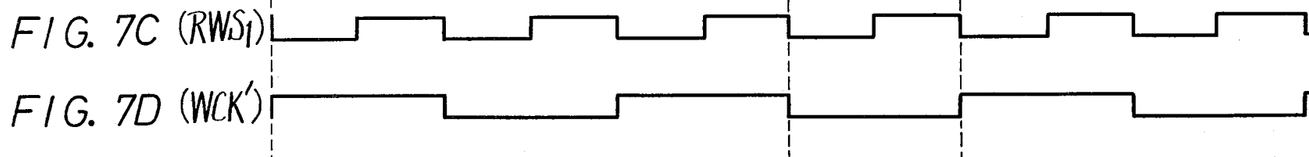
Figures 7E, 7F, 7G:
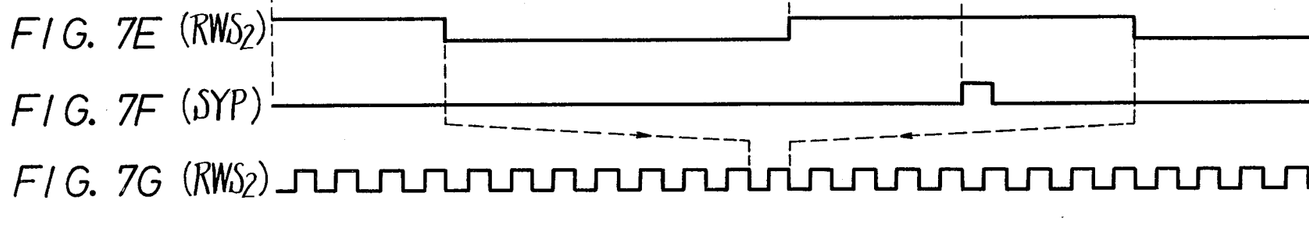

FIG. 7A shows the read/write operations of the memory 14 in which each time the reading of one block is completed, the clock signal RCP is produced and the read address is changed to $+1$ and when the read timing pulse signal $RC_0$ is represented by "0", the data is read out word by word. Since the intervals excluding the data interval (245H) within one field are illustrated in FIG. 7, such Figure does not show the write operation for the data. However, it is apparent that the time intervals except for the read timing will be utilized for the write operation. On addition to the read timing pulse signal $RC_0$, the counters 28 and 29 form the read word selecting pulse signals $RWS_1$ and $RWS_2$ and the word clock signal WCK' which are sequentially frequency-divided by multiplying each by 178 as shown in FIGS. 7C, 7D and 7E. To the error-correction circuit 15 is supplied the output of the memory 14 read out with the timing illustrated in FIG. 7A and the error-correction circuit 15 produces the data after error-corrected which is synchronized with the word clock signal WCK' and one word is positioned alternately at $\frac{1}{2}$ periods each.

Figures 7H, 7I:
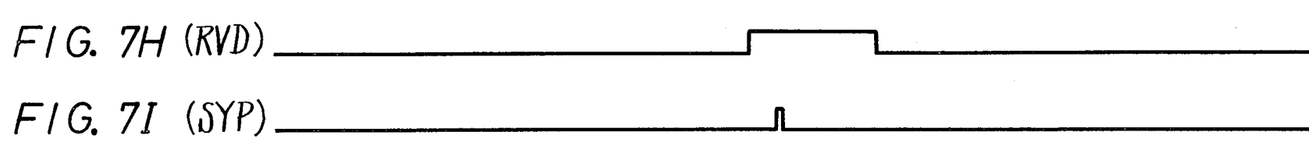

FIG. 7G shows a read word selecting pulse signal $RWS_2$ (FIG. 7E) as time-base which is compressed and the vertical synchronizing pulse signal RVD shown in FIG. 7H is synchronized therewith. As shown in FIGS. 7F and 7I, the set pulse signal SYP is produced which has a fixed phase relative to the vertical synchronizing pulse signal RVD. If the output AD of the address counter 38 is represented as X when the set pulse signal SYP is produced, the first word Wa of the field thereof is written at the address of X+7D and other words Wb, Wc, Wd, P and Q belonging to the same block are written at the addresses of X+6D, X+5D, X+4D, X+3D and X+2D.

The read data of the block next to the block wherein the set pulse signal SYP is produced is the data at the address of X+N. When the writing of one block data is finished, the address of the address counter 38 is turned to X+1. However, since the address of the buffer counter 39 has condition $-1$, the read address is forwarded step by step.

As described, the first word Wa of the first data block in one field is read out as (7D−N) and the block after the set pulse signal SYP is produced as shown in FIG. 6. According to this invention wherein the VTR 18P is synchronized with and driven by the synchronizing signal so as to preset the address counter of the memory as a predetermined value, it is possible to have a timing of the memory to produce the data constantly relative to the synchronizing signal, thus controlling the timing of the error correction circuit 15 and to produce the reproduced data at a constant rate. Since the recording VTR during electronic edition is synchronized with and driven by the synchronizing signal derived from the recording clock signal generator 34, the recording can be performed without error by supplying the output data from the reproducing circuit, to which this invention is applied and to the recording circuit of the recording VTR and also, the data can be very smoothly interconnected with the PCM signal which has already been recorded.

This invention is also usable in a case in which one block is constituted of a PCM data of six words and a parity data of two words. It is also sufficient that the function of the memory can be selective only for de-interleaving, time-base extension and the removal of the time-base variation.

Although the invention has been described with respect to preferred embodiments, it is not to be so limited as changes and modifications can be made which are within the full intended scope of the invention as defined by the appended claims.

We claim as our invention:

1. A PCM signal processing circuit comprising, a signal input terminal for receiving a PCM data signal from PCM data signal reproducing apparatus, a memory for storing said PCM data signal and to be designated an address thereof to be written by an address signal being produced with regard to said PCM data signal, a standardized signal input terminal for receiving a standardized signal corresponding to a synchronizing signal for synchronizing said PCM data signal reproducing apparatus, an address counter for designating an address of said memory to be read, and means for providing said address counter with preset data in response to said every standardized signal as a load signal so that said address counter begins counting read pulses synchronized with said standarized signal from said preset data.

2. A PCM signal processing circuit comprising, a signal input terminal for receiving a PCM data signal, PCM data signal reproducing apparatus, a memory for storing said PCM data signal, a standarized signal input terminal for providing a standarized signal as a synchronizing signal for synchronizing said PCM data signal reproducing apparatus, an address counter for designating an address of said memory to be read, and means for providing said address counter with preset data in response to said standardized signal, phase comparing means for comparing a word clock signal which is being synchronized to said standardized signal with another word clock signal which controls said memory in phase and for generating a detecting signal when phase synchronizing of said word clock signals is obtained, and control means for controlling so that said preset data is loaded into said address counter in response to said detecting signal.

3. A PCM processing circuit according to claim 1 wherein said synchronizing signal is generated by a recording clock signal generator and a master clock signal generator.

4. A PCM processing circuit according to claim 1 including address selectors, an adder receiving output of said address selectors and said address counter and supplying an input to said memory.

5. A PCM signal processing circuit comprising, a reproducing video recorder, a data extracting circuit and a synchronizing signal separator circuit receiving outputs of said reproducing video recorder, a recording clock signal generator supplying a sync signal to said reproducing video recorder, a word selector connected to the output of said data extracting circuit, a memory receiving the output of said word selector, a first counter, a first comparator receiving inputs from said first counter, a first switch for connecting in a first position the output of said recording clock signal generator to said first comparator, a crystal oscillator, a controllable counter receiving inputs from said first comparator, a second switch which in a first position supplies the output of said crystal oscillator to said controllable counter, said first counter connected to receive an output of said controllable counter, and a read/write controller receiving an output from first counter and supplying inputs to said memory.

6. A PCM signal processing circuit according to claim 5 including a third counter receiving the output of said first counter, a second comparator receiving inputs from said third counter and said synchronizing signal separator, and a controllable oscillator receiving the output of said second comparator and supplying an output to said controllable counter when said second switch is in a second position.

7. A PCM signal processing circuit according to claim 6 including a low pass filter connected between said controllable oscillator and said second comparator.

8. A PCM signal processing circuit according to claim 6 including a fourth counter connected between said first and third counters.

9. A PCM signal processing circuit according to claim 6 including a buffer counter receiving inputs from said read/write controller, an address counter receiving an input from said read/write controller, an address selector receiving an output from said buffer counter, and an adder receiving outputs from said address counter and said address selector and supplying an input to said memory.

10. A PCM signal processing circuit according to claim 9 wherein said address selector receives inputs from said word selector, and said first and fourth counters and supplies an input to said memory.

11. A PCM signal processing circuit according to claim 10 including a decoder connected between certain inputs of said address selector and said word selector.

12. A PCM signal processing circuit according to claim 9 including an AND gate receiving inputs from said recording clock signal generator and said first comparator, and a set pulse generator receiving the output of said AND gate and supplying an output to said buffer counter.

13. A PCM signal processing circuit according to claim 12 wherein said set pulse generator supplies inputs to said fourth counter.

14. A PCM signal according to claim 9 including an error-correction circuit which receives the output of said memory.

* * * * *